(12) United States Patent
Holmes et al.

(10) Patent No.: US 8,536,830 B2
(45) Date of Patent: Sep. 17, 2013

(54) INDUCTIVE CHARGING SYSTEM FOR AN ELECTRIC VEHICLE

(75) Inventors: Alan G. Holmes, Clarkston, MI (US); Edward D. Tate, Jr., Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 355 days.

(21) Appl. No.: 13/075,276

(22) Filed: Mar. 30, 2011

(65) Prior Publication Data

US 2012/0249063 A1 Oct. 4, 2012

(51) Int. Cl.
*H02J 7/00* (2006.01)
*H02J 7/14* (2006.01)
*H01F 27/42* (2006.01)

(52) U.S. Cl.
USPC ............ 320/108; 320/104; 320/109; 307/104

(58) Field of Classification Search
USPC .......................................... 320/108, 104, 109
See application file for complete search history.

(56) References Cited

U.S. PATENT DOCUMENTS

| 3,885,211 | A | * | 5/1975 | Gutai | 320/108 |
| 5,498,948 | A | * | 3/1996 | Bruni et al. | 320/108 |
| 6,310,465 | B2 | * | 10/2001 | Najima | 320/150 |

* cited by examiner

*Primary Examiner* — M'Baye Diao
(74) *Attorney, Agent, or Firm* — Quinn Law Group, PLLC

(57) ABSTRACT

An electric vehicle includes a charging receiver unit. The charging receiver unit includes a plurality of core members, a plurality of biasing devices, and a receiver wire. The plurality of core members are disposed in spaced relationship to one another. Each of the plurality of core members is configured for alignment with a plurality of magnetic elements. The plurality of biasing devices longitudinally bias a respective one of the plurality of core members toward a respective one of the plurality of magnetic elements such that magnetic flux is transmitted between each of the plurality of magnetic elements and the respective one of the plurality of core members. The receiver wire is disposed in electrical communication with each of the plurality of core members. Magnetic flux in the plurality of core members induces electrical current in the receiver wire.

20 Claims, 6 Drawing Sheets

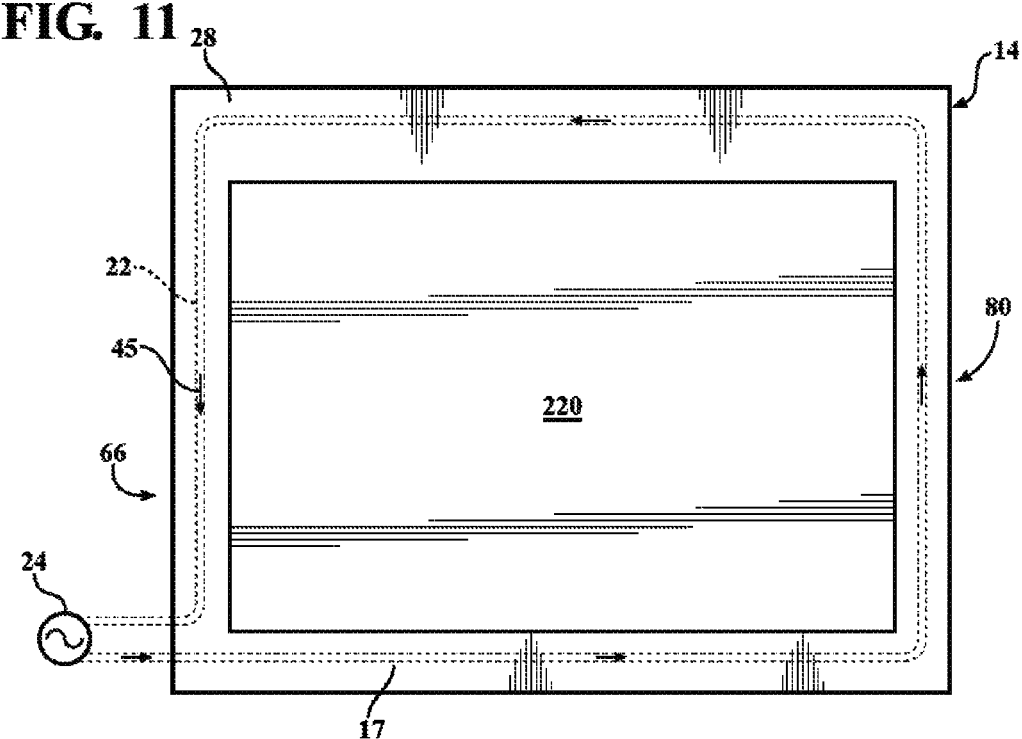
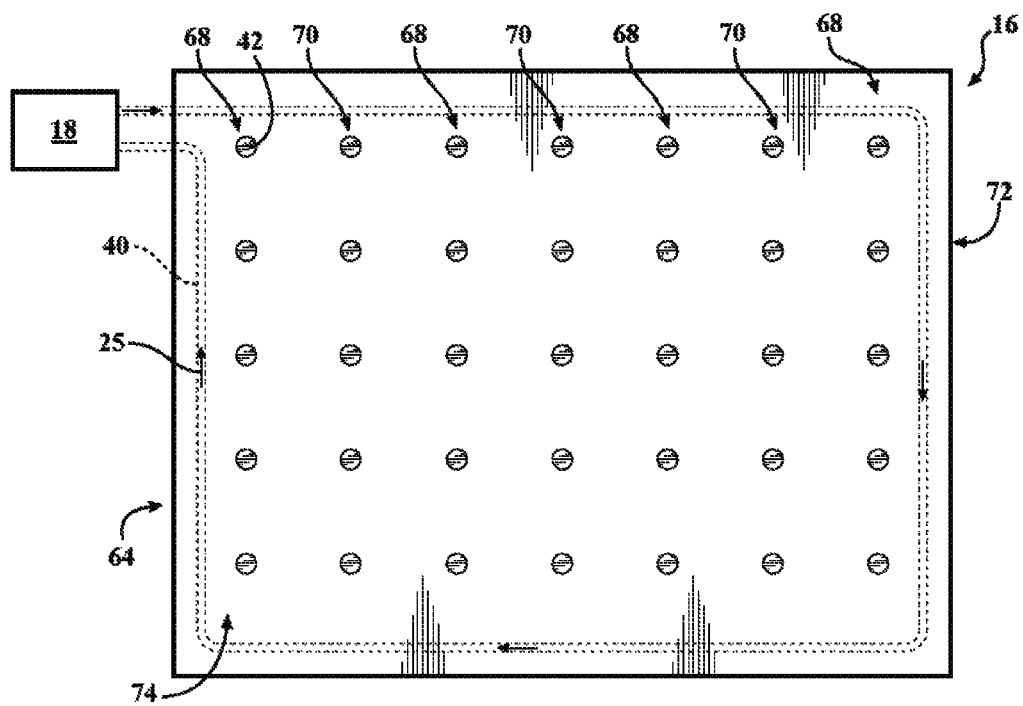

INDUCTIVE CHARGING SYSTEM FOR AN ELECTRIC VEHICLE

TECHNICAL FIELD

The invention generally relates to an inductive charging system for an electric vehicle.

BACKGROUND

Vehicles employ various power sources for propulsion. Such power sources may include an internal combustion engine and/or one or more electric motors or a fuel-cell.

Each power source typically requires an energy storage device configured to receive and store energy, and to supply the stored energy to operate the power source. A specific amount of energy stored within the energy storage device generally operates the vehicle for a finite driving range. When the energy contained within the energy storage device is reduced, the energy storage device will be recharged.

SUMMARY

An electric vehicle includes a charging receiver unit. The charging receiver unit includes a plurality of core members, a plurality of biasing devices, and a receiver wire. The plurality of core members are disposed in spaced relationship to one another. Each of the plurality of core members is configured for alignment with a plurality of magnetic elements. The plurality of biasing devices longitudinally bias a respective one of the plurality of core members toward a respective one of the plurality of magnetic elements such that magnetic flux is transmitted between each of the plurality of magnetic elements and the respective one of the plurality of core members. The receiver wire is disposed in electrical communication with each of the plurality of core members. Magnetic flux in the plurality of core members induces electrical current in the receiver wire.

An induction charging system includes a charging supply unit and an electric vehicle. The charging supply unit includes a plurality of magnetic elements, a supply wire, and a power supply. The plurality of magnetic elements are disposed in spaced relationship to one another. The supply wire is disposed in electrical communication with each of the plurality of magnetic elements. A first electrical current is transmitted through the supply wire and induces magnetic flux in each of the plurality of magnetic elements. The power supply is in electrical communication with the supply wire. The power supply supplies the first electrical current to the supply wire. The electric vehicle includes a charging receiver unit. The charging receiver unit includes a plurality of core members, a plurality of biasing devices, a receiver wire, and an energy storage device. The plurality of core members are disposed in spaced relationship to one another. Each of the plurality of core members is aligned longitudinally with a respective one of the plurality of magnetic elements. The plurality of biasing devices longitudinally bias a respective one of the plurality of core members toward a respective one of the plurality of magnetic elements such that magnetic flux is transmitted between each of the plurality of magnetic elements and the respective one of the plurality of core members. The receiver wire is disposed in electrical communication with each of the plurality of core members. Magnetic flux in the plurality of core members induces electrical current in the receiver wire. The energy storage device is disposed in electrical communication with the receiver wire. The receiver wire transmits the second electrical current to the energy storage device.

An induction charging system includes a charging supply unit and an electric vehicle. The charging supply unit includes a plurality of magnetic elements, and a supply wire. The plurality of magnetic elements are disposed in spaced relationship to one another. The supply wire is disposed in electrical communication with each of the plurality of magnetic elements. A first electrical current is transmitted through the supply wire and induces magnetic flux in each of the plurality of magnetic elements. The electric vehicle includes a charging receiver unit. The charging receiver unit includes a plurality of core members, a plurality of biasing devices, and a receiver wire. The plurality of core members are disposed in spaced relationship to one another. Each of the plurality of core members is aligned longitudinally with a respective one of the plurality of magnetic elements. The plurality of biasing devices longitudinally bias a respective one of the plurality of core members toward a respective one of the plurality of magnetic elements such that magnetic flux is transmitted between each of the plurality of magnetic elements and the respective one of the plurality of core members. The receiver wire is disposed in electrical communication with each of the plurality of core members. Magnetic flux in the plurality of core members induces electrical current in the receiver wire. The energy storage device is disposed in electrical communication with the receiver wire.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 11 is a schematic plan view of the charging supply unit of FIG. 9; and FIG. 12 is a schematic plan view of the charging receiver unit of FIG. 9.

DETAILED DESCRIPTION

Figure 1:
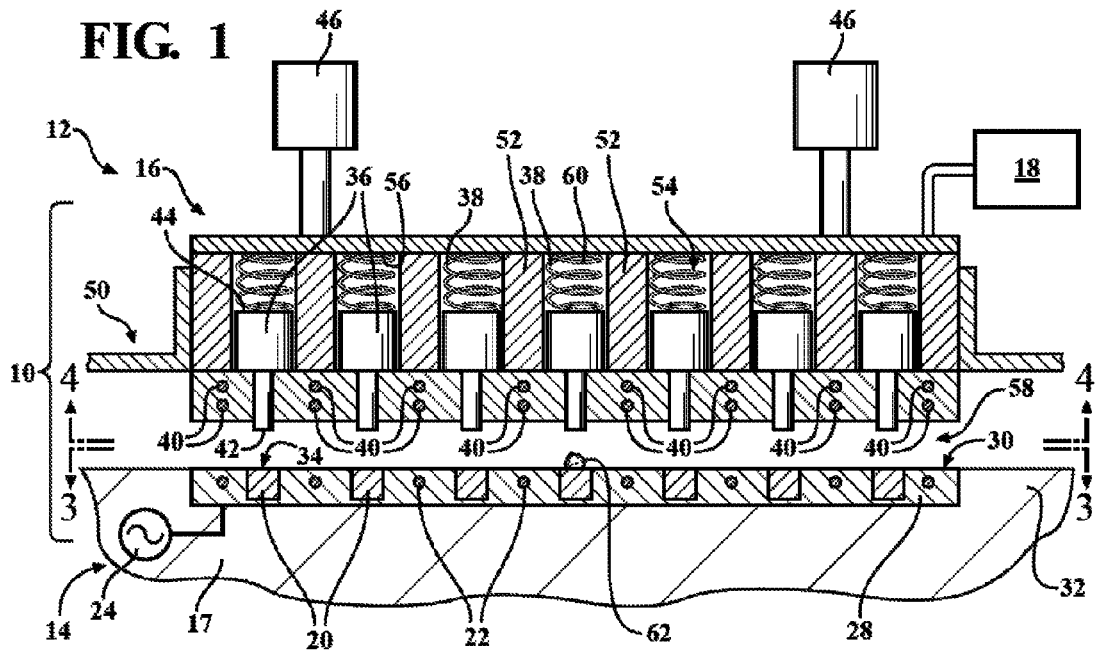
FIG. 1 is a schematic partial cross-sectional side view of an induction charging system including a charging supply unit and an electric vehicle having a charging receiver unit in a retracted position.

Referring to the drawings, wherein like reference numbers correspond to like or similar components throughout the several figures, FIG. 1 shows an induction charging system 10 including an electric vehicle 12 and a charging supply unit 14. The electric vehicle 12 may be a battery electric vehicle 12 (BEV), an extended-range electric vehicle 12 (EREV), a plug-in hybrid electric vehicle 12 (PHEV), and the like.

The electric vehicle 12 includes a charging receiver unit 16. The charging receiver unit 16 is configured to receive electric current transmitted from a charging supply unit 14 located at any of a plurality of charging stations 17, disposed in various geographical locations. The charging receiver unit 16 includes an energy storage device 18 that may be an electric energy storage device 18, such as a rechargeable battery and the like, that is configured to be electrically charged at one of the charging stations 17 via the charging supply unit 14.

When the electric vehicle 12 is at one of the charging stations 17, the energy storage device 18 is configured to selectively receive an electric charge from the charging supply unit 14 of the charging station 17. More specifically, when the charging receiver unit 16 of the electric vehicle 12 is mated with, or otherwise aligned with, the charging supply unit 14 of the charging station 17, the charging receiver unit 16 and the charging supply unit 14 cooperate to provide the induction charging system 10 that selectively transfers electric energy from the charging supply unit 14 to the energy storage device 18 of the charging receiver unit 16 of the electric vehicle 12. As will be explained in more detail below, in order to allow magnetic flux 26 to flow efficiently between the charging supply unit 14 and the charging receiver unit 16, the charging supply unit 14 and the charging receiver unit 16 need to come as closely together as possible to eliminate or otherwise reduce any air gaps 58.

Figure 3:
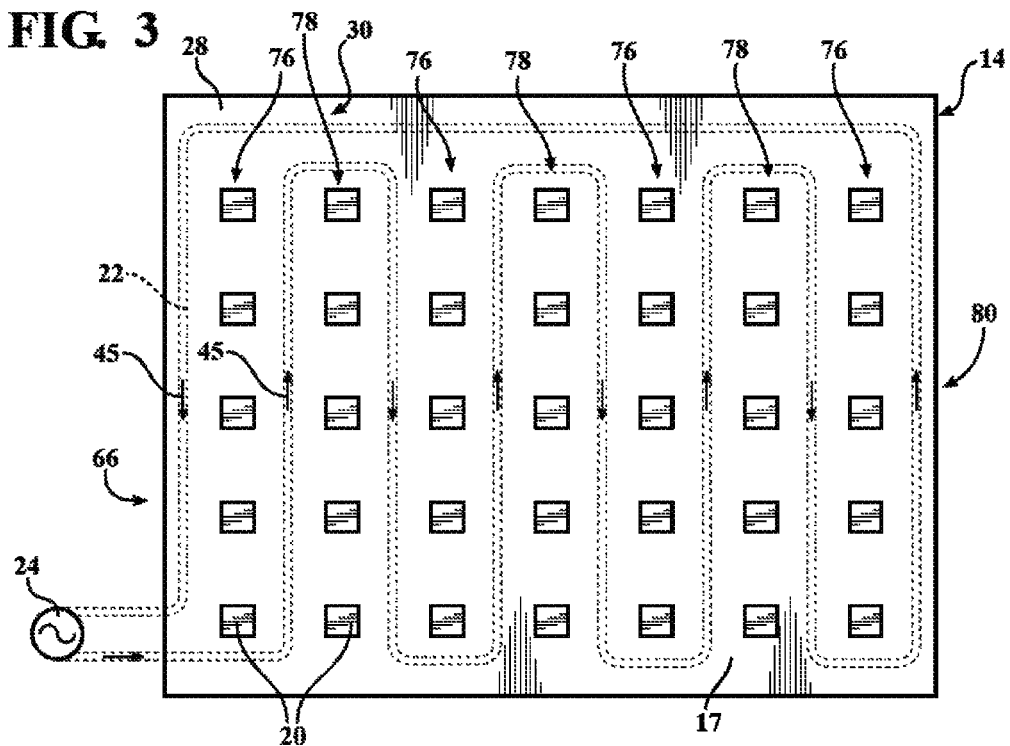
FIG. 3 is a schematic plan view of the charging supply unit of FIG. 1.

The charging supply unit 14 is integrated in, or otherwise provided by, the charging station 17. The charging supply unit 14 includes a plurality of magnetic elements 20, a supply wire 22, and a power supply 24. The magnetic elements 20 are disposed in spaced relationship to one another, as shown in FIG. 3. The magnetic elements 20 may be formed from magnetic material, e.g., iron, steel, ceramics, and/or other nonmagnetic and magnetic materials.

The power supply 24 is in electrical communication with the supply wire 22 such that the power supply 24 supplies a first electrical current 25 to the supply wire 22. The supply wire 22 is disposed in electrical communication with each of the magnetic elements 20. More specifically, the first electrical current 25 is transmitted through the supply wire 22 by the power supply 24, which induces magnetic flux 26 in each of the plurality of magnetic elements 20.

Figure 2:
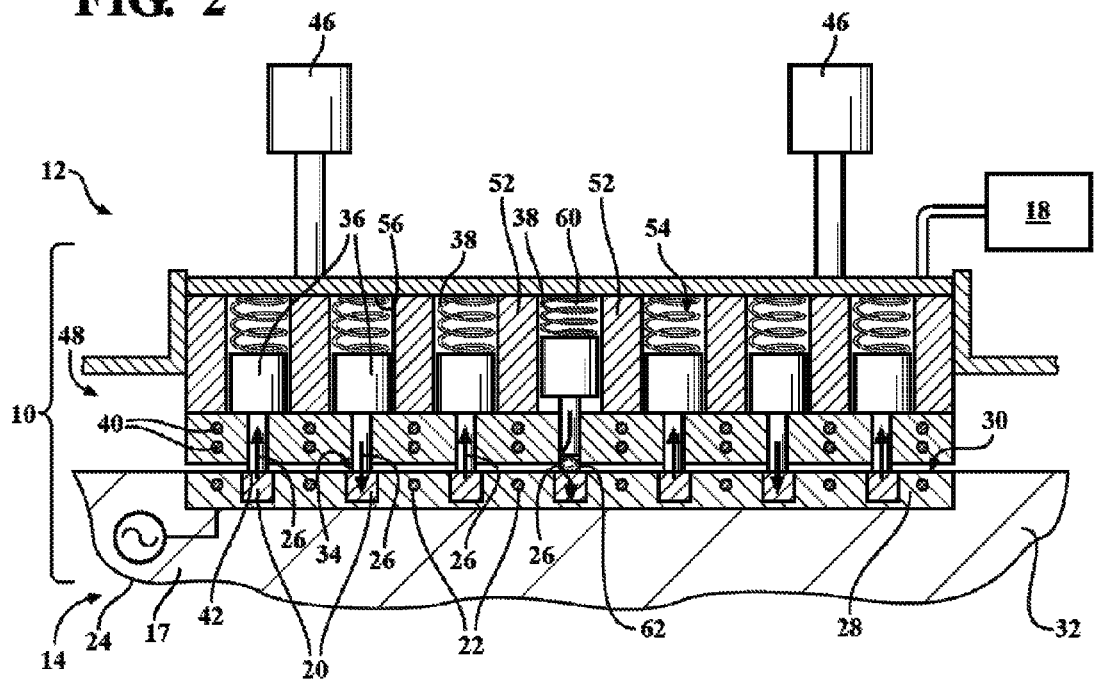
FIG. 2 is a schematic partial cross-sectional side view of the induction charging system of FIG. 1, with the charging receiver unit in the extended position

The charging supply unit 14 further includes a plate 28 that presents a first surface 30. The charging supply unit 14 may be disposed in the ground 32, such that the first surface 30 is generally flush with the ground 32. Each magnetic element 20 presents an end surface 34 and is embedded within the plate 28 such that each of the end surfaces 34 are at least proximate the first surface 30 of the plate 28. Referring to FIG. 2, the first surface 30 and each of the end surfaces 34 are flush. The first surface 30 may be planar. However, environmental operating conditions may affect the plate 28 once the plate 28 is installed in the ground 32 such that the first surface 30 may become warped, curved, and/or non-planar, as will be explained in more detail below.

Figure 4:
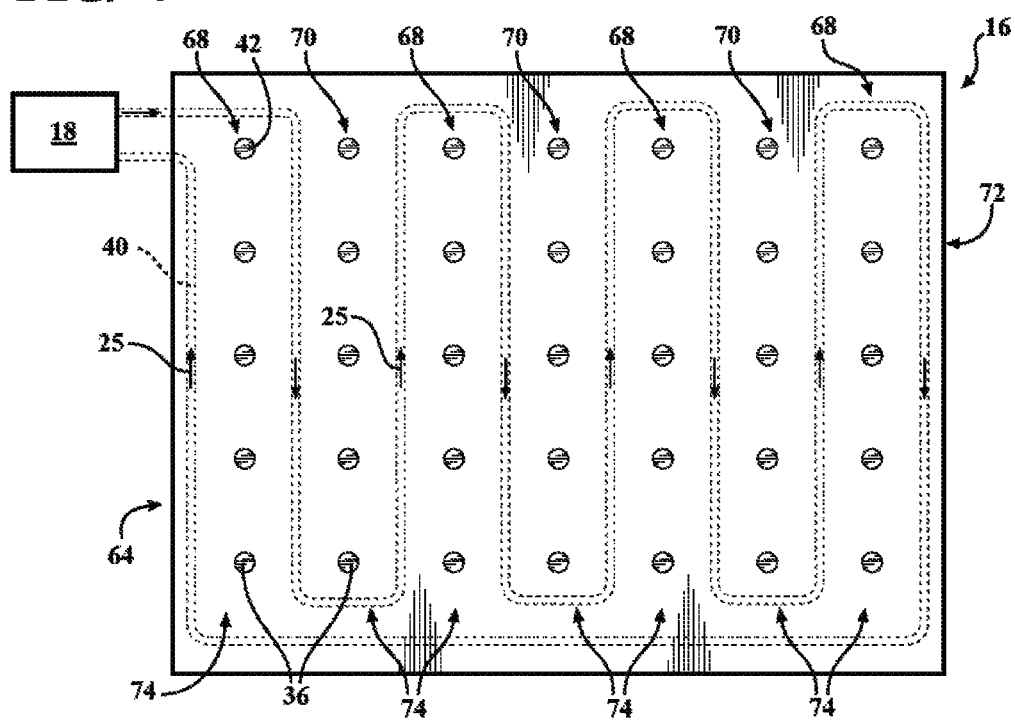
FIG. 4 is a schematic plan view of the charging receiver unit of FIG. 1.

Referring to FIG. 4, the charging receiver unit 16 includes a plurality of core members 36, a plurality of biasing devices 38, a receiver wire 40, and the energy storage device 18. The core members 36 may be formed from magnetic material, e.g., iron, steel, ceramics, and/or other nonmagnetic and magnetic materials. The core members 36 may be generally cylindrical in shape and extend longitudinally between a first end 42 and a second end 44. The core members 36 may be other shapes besides cylindrical. The core members 36 are disposed in spaced relationship to one another and are longitudinally aligned with a respective one of the magnetic elements 20 of the charging supply unit 14, as shown in FIGS. 1 and 2.

The receiver wire 40 is disposed in electrical communication with each of the core members 36 and the energy storage device 18. Referring to FIG. 2, magnetic flux 26 flows from a plurality of the magnetic elements 20, and into the corresponding core members 36 to induce a second electrical current 45 (FIG. 3) in the receiver wire 40. The receiver wire 40, in turn, transmits the second electrical current 45 to the energy storage device 18.

In order to achieve a tight fit and reduce the air gap 58 between the charging supply unit 14 and the charging receiver unit 16, the charging receiver unit 16 is movable longitudinally away from the electric vehicle 12 and toward the magnetic elements 20 of the charging supply unit 14. An actuator 46 is operatively connected to the charging receiver unit 16 and is configured for moving the charging receiver unit 16 longitudinally between a retracted position 50, as shown in FIG. 1, and an extended position 48, as shown in FIG. 2. The extended position 48 is a position that is away from the vehicle, toward the plurality of magnetic elements 20. The retracted position 50 is a position that is toward the vehicle, away from the magnetic elements 20. The actuator 46 lowers the charging receiver unit 16 into the extended position 48 such that the core members 36 are proximate or contact the respective magnetic elements 20. Likewise, when the actuator 46 retracts the charging receiver unit 16 into the retracted position 50.

Referring specifically to FIG. 1, the air gap 58 is generally defined between the first end 42 of each of the core members 36 and the end surface 34 of the respective magnetic elements 20. Magnetic flux 26 may be transmitted between each of the magnetic elements 20 and the respective core members 36 when the first end 42 of the core members 36 is at least proximate the end surface 34 of the respective magnetic element 20, as shown in FIG. 2. However, the larger the air gap 58, the greater the flux leakage through the air gap 58, and the less magnetic flux 26 that is transferred between the magnetic elements 20 and the core members 36. Therefore, reducing, or otherwise eliminating the air gap 58 reduces the flux leakage from the air gap(s) 58 and increases the efficiency of the induction charging system 10.

The charging receiver unit 16 further includes a housing 52 that defines a plurality of bores 54. Each bore 54 extends longitudinally to a respective ceiling 56. The core members 36 are longitudinally movably disposed in a respective one of the bores 54.

One of the biasing devices 38 is disposed between the respective one of the core members 36 and the corresponding ceiling 56. The biasing devices 38 each longitudinally bias a respective one of the core members 36 toward or otherwise against a respective one of the magnetic elements 20 to reduce, or otherwise eliminate, the air gap 58 defined between the first ends 42 of each of the core members 36 and the end surface 34 of each of the corresponding magnetic elements 20. The biasing devices 38 may be a spring, e.g., a compression spring 60, a leaf spring, and the like. Each of the biasing devices 38 reacts between the second end 44 of the respective bore 54 and the respective ceiling 56 to independently bias each of the respective core members 36 longitudinally, away from the respective ceiling 56 and toward the respective magnetic element 20. This means that each core member 36 is individually biasable, longitudinally, with respect to the other core members 36 such that the core members 36 conform to the corresponding magnetic elements 20 that are disposed within the plate 28, regardless of whether the first surface 30 of the magnetic elements 20 are arranged in non-planar relationship to one another or whether debris 62 is present on one or more magnetic elements 20. As a result, magnetic flux 26 is transmitted between each of the magnetic elements 20 and the respective core members 36, with as little flux leakage as possible. Having a separate biasing device 38 for each of the core members 36 allows the core members 36 to independently conform to the shape of the first surface 30 and/or any debris 62 present on the first surface 30. By way of a non-limiting example, if debris 62 is present on the first surface 30, as illustrated in FIGS. 1 and 2, when the charging receiver unit 16 is in the extended position 48, only the core member(s) 36 that correspond to and contact the debris 62 will be biased by the debris 62, while the other core members 36 will be unaffected by the debris 62. Therefore, the other core members 36 will be biased toward or otherwise against the first surface 30 to reduce and/or eliminate the air gap 58. By way of another non-limiting example, if the first surface 30 is warped, bent, and/or non-planar, when the charging receiver unit 16 is in the extended position 48, each of the core members 36 will be independently biased by differing amounts, based on where each core member 36 longitudinally contacts the corresponding portion of the first surface 30. By independently biasing each of the core members 36, the core members 36 are configured to conform to the first surface 30, even when the first surface 30 is non-planar and/or otherwise not parallel with the first surface 30.

The core members 36 are arranged in a first array 64, as shown in FIG. 4, and the magnetic elements 20 are arranged in a second array 66, as shown in FIG. 3. The first array 64, of the charging receiver unit 16, and the second array 66, of the charging supply unit 14, may be arranged identically. Alternatively, the first array 64 may have a differing number of core members 36 from the magnetic elements 20 of the second array 66. Additionally, the first array 64 and/or the second array 66 may be formed as being rectangular, square, octagonal, circular, and the like. Also, differing patterns of flux may be generated to flow between the magnetic elements 20 and the core members 36, based on the routing of the supply wire 22 about and/or between the magnetic elements 20 and the routing of the receiver wire 40 about and/or between the core elements.

Referring to the charging receiver unit 16 shown in FIG. 4, the receiver wire 40 extends between a first set of core members 68 and a second set of core members 70 such that magnetic flux 26 (shown in FIG. 2) flows between the plurality of core members 36 and the plurality of magnetic elements 20 to induce the first electrical current 25 through the receiver wire 40. The magnetic flux 26 flowing through the first set of core members 68 is of opposite polarity to the magnetic flux 26 flowing through the second set of core members 70. The core members 36 are arranged in a first grid-like array 72 having a plurality of columns 74. The receiver wire 40 is woven back and forth between each adjacent pair of the plurality of columns 74 of the core members 36 such that the magnetic flux 26 flows between the plurality of core members 36 and the plurality of magnetic elements 20 to induce the first electrical current 25 through the receiver wire 40. The magnetic flux 26 flowing through the core members 36 in each of the plurality of columns 74 is of opposite polarity to the magnetic flux 26 flowing through the core members 36 in the respective adjacent column 74.

Referring to the charging supply unit 14 shown in FIG. 3, the supply wire 22 extends between a first set of magnetic elements 76 and a second set of magnetic elements 78 to generate magnetic flux 26 through the plurality of magnetic elements 20. The magnetic flux 26 generated through each of the first set of magnetic elements 76 is of opposite polarity to the magnetic flux 26 generated through each of the second set of magnetic elements 78 such that the second electrical current 45 flowing through the supply wire 22 generates magnetic flux 26 through the plurality of magnetic elements 20. The magnetic elements 20 are arranged in a second grid-like array 80 having a plurality of columns 74. The supply wire 22 is woven back and forth between each adjacent pair of the plurality of columns 74 of magnetic elements 20 to generate magnetic flux 26 through the plurality of magnetic elements 20. The magnetic flux 26 generated through each of the magnetic elements 20 in each of the plurality of columns 74 is of opposite polarity to the magnetic flux 26 generated through each of the magnetic elements 20 in the respective adjacent column 74 such that the second electrical current 45 flowing through the supply wire 22 generates magnetic flux 26 through the plurality of magnetic elements 20.

Figure 5:
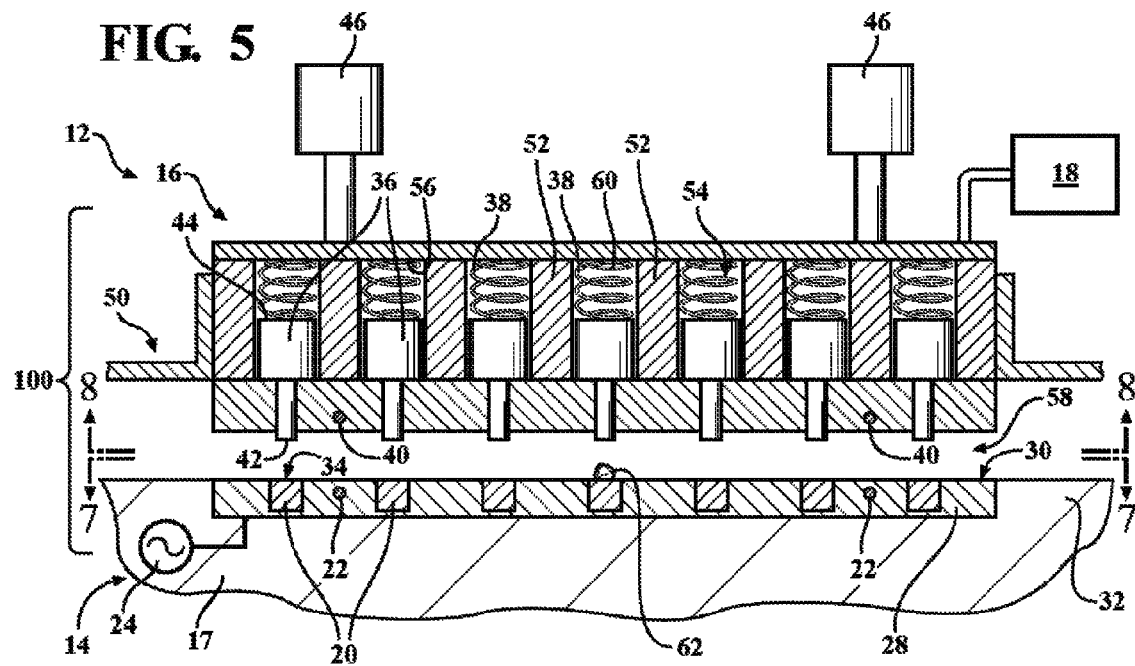
FIG. 5 is a schematic partial cross-sectional side view of another embodiment of the induction charging system of FIG. 1 with the charging receiver unit in a retracted position.
Figure 6:
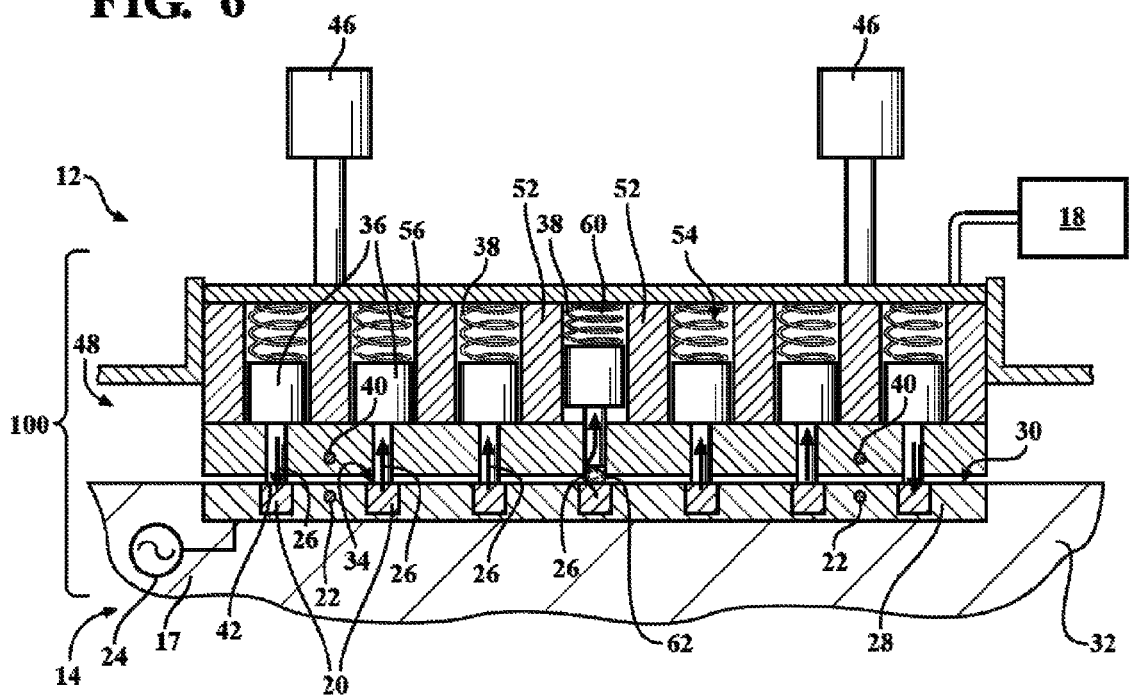
FIG. 6 is a schematic partial cross-sectional side view of the induction charging system of FIG. 5, with the charging receiver unit in the extended position
Figure 8:
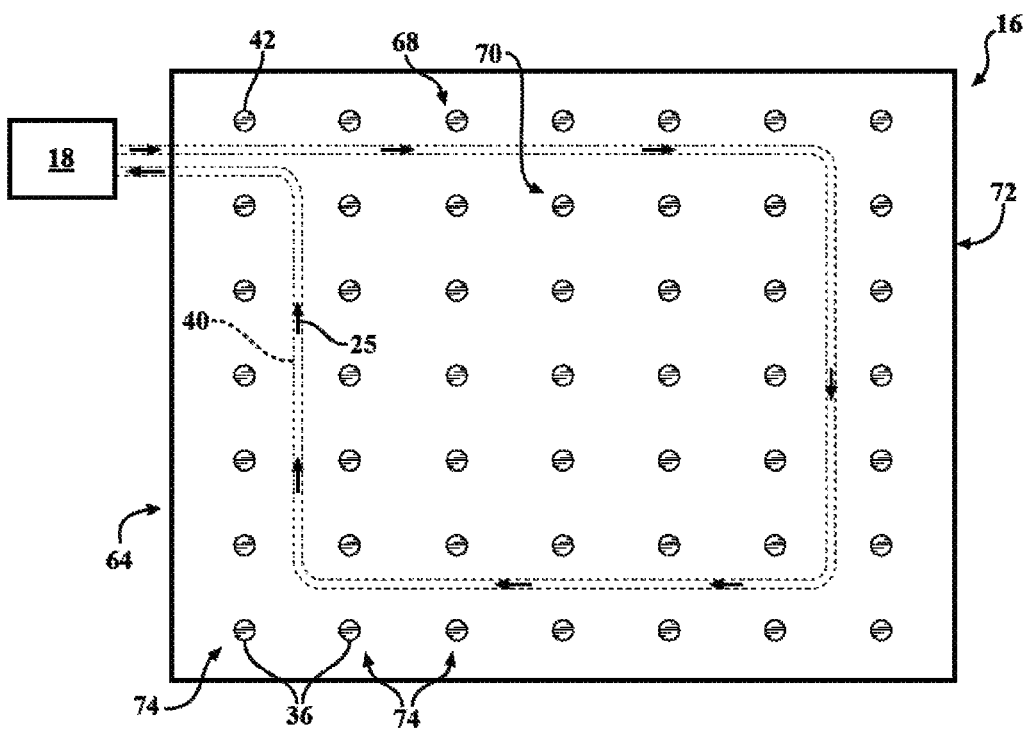
FIG. 8 is a schematic plan view of the charging receiver unit of FIG. 5.

Referring now to FIGS. 5 and 6, another induction charging system 100 is shown. The induction charging system shown in FIGS. 5 and 6 is generally identical to the induction charging system 10 of FIGS. 1 and 2, except for the arrangement of the supply wire 22 within the charging supply unit 14 and the receiver wire 40 within the charging receiver unit 16. More specifically, referring to FIG. 8, the receiver wire 40 extends, or is otherwise routed, between a first set of core members 68 and a second set of core members 70 such that magnetic flux 26 (shown in FIG. 6) flows between the plurality of core members 36 and the plurality of magnetic elements 20 to induce the first electrical current 25 through the receiver wire 40. The magnetic flux 26 flowing through the first set of core members 68 is of opposite polarity to the magnetic flux 26 flowing through the second set of core members 70. The core members 36 are arranged in a first grid-like array 72 having a plurality of columns 74. The receiver wire 40 is looped about the outer perimeter of the second set of core members 70 and within the first set of core members 68. Accordingly, the magnetic flux 26 flows between the plurality of core members 36 and the plurality of magnetic elements 20 to induce the first electrical current 25 through the receiver wire 40. The magnetic flux 26 flowing through the first set of core members 68 is of opposite polarity to the magnetic flux 26 flowing through the second set of core members 70.

Figure 7:
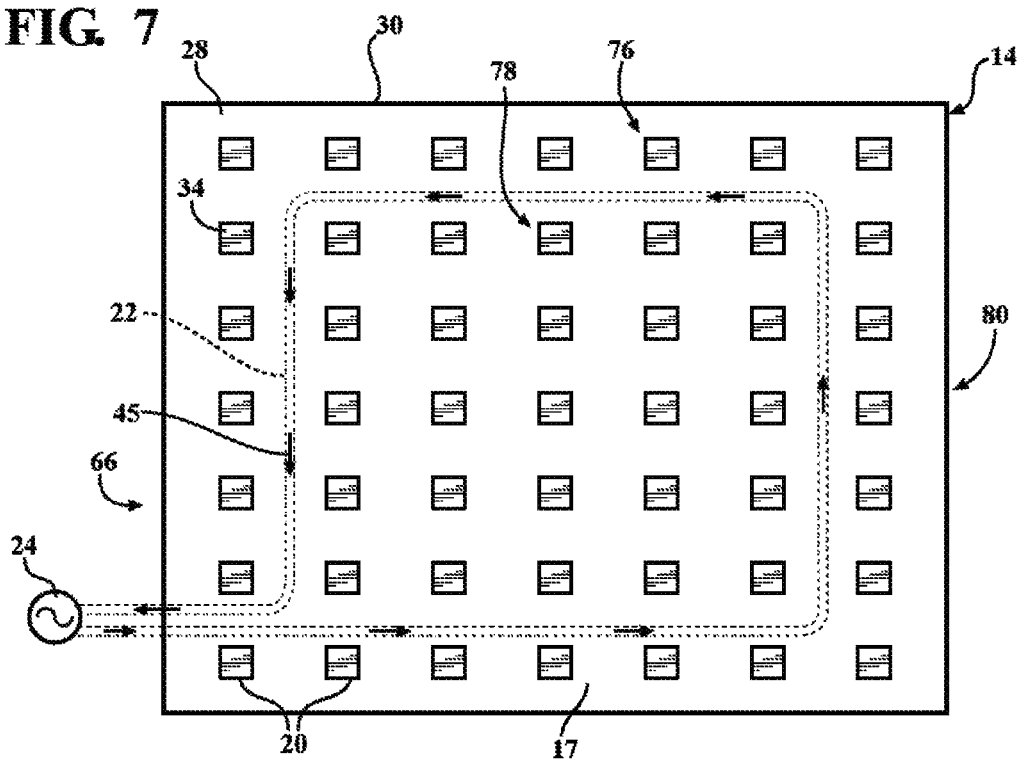
FIG. 7 is a schematic plan view of the charging supply unit of FIG. 5.

Referring again to FIG. 7, the supply wire 22 extends between a first set of magnetic elements 76 and a second set of magnetic elements 78 to generate magnetic flux 26 through the plurality of magnetic elements 20. The magnetic flux 26 generated through each of the first set of magnetic elements 76 is of opposite polarity to the magnetic flux 26 generated through each of the second set of magnetic elements 78 such that the second electrical current 45 flowing through the supply wire 22 generates magnetic flux 26 through the plurality of magnetic elements 20. The magnetic elements 20 are arranged in a second grid-like array 80 having a plurality of columns 74. The supply wire 22 is looped around the outer perimeter of the second set of magnetic elements 78 and within the first set of magnetic elements 76. Accordingly, magnetic flux 26 is generated through the plurality of magnetic elements 20. The magnetic flux 26 generated through each of the magnetic elements 20 in the first set of magnetic elements 76 is of opposite polarity to the magnetic flux 26 generated through each of the second set of magnetic elements 78 such that the second electrical current 45 flowing through the supply wire 22 generates magnetic flux 26 through the plurality of magnetic elements 20.

Figure 9:
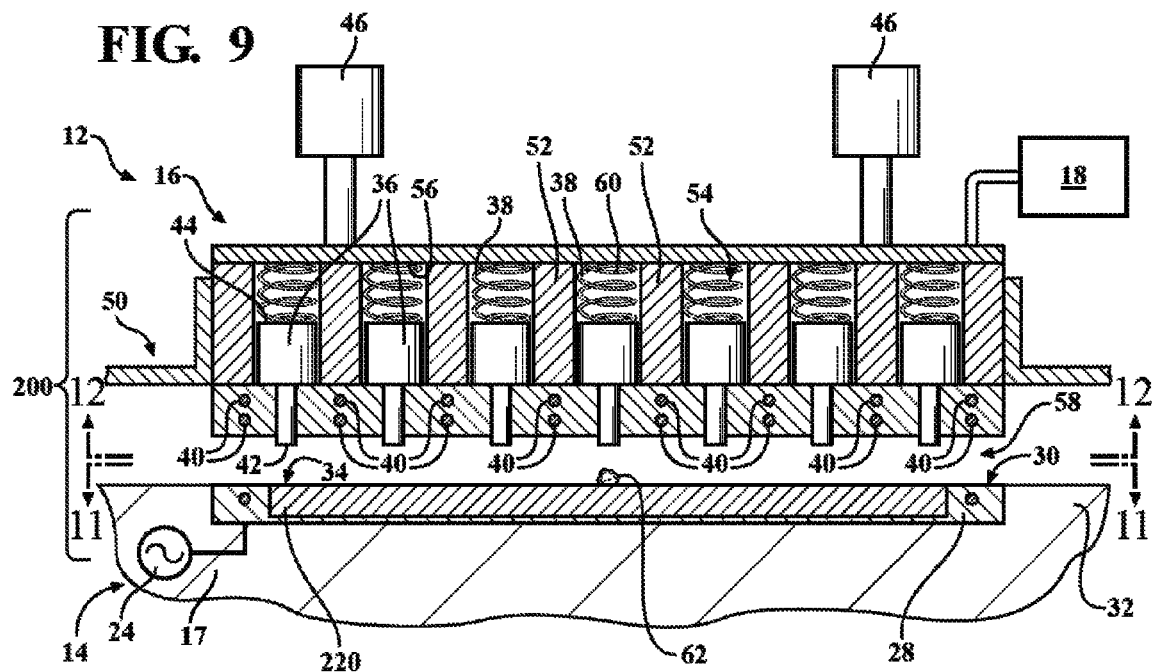
FIG. 9 is a schematic partial cross-sectional side view of yet another embodiment of the induction charging system of FIG. 1 with the charging receiver unit in a retracted position.
Figure 10:
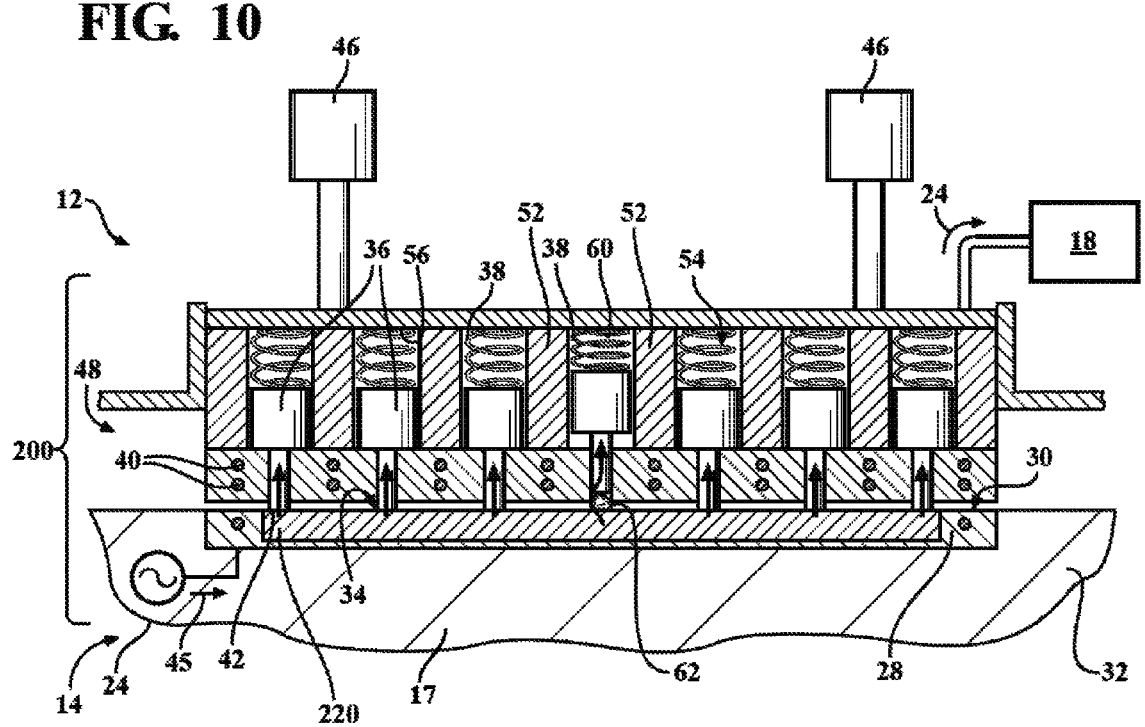
FIG. 10 is a schematic partial cross-sectional side view of the induction charging system of FIG. 9, with the charging receiver unit in the extended position

Referring to FIGS. 9 and 10, yet another induction charging system 200 is shown. The induction charging system shown in FIGS. 9 and 10 is generally identical to the induction charging systems 10, 100 of FIGS. 1-8, except for the arrangement of the supply wire 22 within the charging supply unit 14 and the receiver wire 40 within the charging receiver unit 16. Additionally, the magnetic elements of the charging supply unit 14 are formed as a single magnetic plate 220. The supply wire 22 extends about magnetic plate 220 (shown in FIG. 11) such that magnetic flux 26 flows from the magnetic plate 220 to the plurality of core members 36 to induce the electrical current 25 through the receiver wire 40, as shown in FIG. 10.

Referring now to FIG. 12, the core members 36 are arranged in a first grid-like array 72 having a plurality of columns 74. The receiver wire 40 is looped around the outer perimeter of the core members 36. Accordingly, the magnetic flux 26 flows from the magnetic plate 220 to each of the plurality of core members 36 to induce the second electrical current 45 (FIG. 9) through the receiver wire 40. The magnetic flux 26 flowing through the core members 36 in each of the plurality of columns 74 is of the same polarity as the magnetic flux 26 flowing through the core members 36 in the respective adjacent column(s) 74.

While the best modes for carrying out the invention have been described in detail, those familiar with the art to which this invention relates will recognize various alternative designs and embodiments for practicing the invention within the scope of the appended claims.

The invention claimed is:

1. An electric vehicle comprising a charging receiver unit, wherein the charging receiver unit includes:
a plurality of core members disposed in spaced relationship to one another, wherein each of the plurality of core members is configured for alignment with at least one magnetic element;
a plurality of biasing devices, wherein each of the plurality of biasing devices longitudinally biases a respective one of the plurality of core members toward said at least one magnetic element such that magnetic flux is transmitted between each of the plurality of magnetic elements and the respective one of the plurality of core members; and
a receiver wire disposed in electrical communication with each of the plurality of core members, wherein magnetic flux through the plurality of core members induces electrical current in the receiver wire.

2. An electric vehicle, as set forth in claim 1, wherein the electric vehicle further comprises an energy storage device in electrical communication with the receiver wire, wherein the receiver wire transmits the electrical current to the energy storage device.

3. An electric vehicle, as set forth in claim 1, wherein the charging receiver unit further includes a housing defining a plurality of bores, wherein each of the plurality of bores extends to a respective ceiling;
wherein each of the plurality of core members is movably disposed in a respective one of the plurality of bores; and
wherein each of the plurality of biasing devices is disposed between the respective one of the plurality of core members and the corresponding ceiling such that each of the plurality of biasing devices reacts between the respective one of the plurality of bores and the respective ceiling to bias each of the respective one of the plurality of core members longitudinally away from the respective ceiling and toward said at least one magnetic element such that magnetic flux is transmitted between said at least one magnetic element and the respective one of the plurality of core members.

4. An electric vehicle, as set forth in claim 3, wherein the charging receiver unit is movable longitudinally away from the vehicle and toward said at least one magnetic element.

5. An electric vehicle, as set forth in claim 4, further comprising an actuator operatively connected to the charging receiver unit and configured for moving the charging receiver unit longitudinally between an extended position and a retracted position;
wherein the extended position is away from the vehicle, in a direction toward said at least one magnetic element, and the retracted position, in a direction opposite said at least one magnetic element.

6. An electric vehicle, as set forth in claim 1, wherein the plurality of core members are arranged in an array.

7. An electric vehicle, as set forth in claim 6, wherein the receiver wire extends between a first set of core members and a second set of core members to generate magnetic flux through each set of core members; and
wherein a polarity of the magnetic flux generated through the first set of core members is opposite a polarity of the magnetic flux generated through the second set of core members to induce electrical current through the receiver wire.

8. An electric vehicle, as set forth in claim 6, wherein the plurality of core members are arranged in an grid-like array having a plurality of columns;
wherein the receiver wire is woven back and forth between each adjacent pair of the plurality of columns of core members to generate magnetic flux through each of the plurality of core members; and
wherein a polarity of the magnetic flux generated through the core members in each of the plurality of columns is opposite a polarity of the magnetic flux generated through the core members in the respective adjacent column such that the magnetic flux generated through the plurality of core members induces electrical current through the receiver wire.

9. An induction charging system comprising:
a charging supply unit including:
at least one magnetic element;
a supply wire in electrical communication with said at least one magnetic element, wherein a first electrical current is transmitted through the supply wire and induces magnetic flux through said at least one magnetic element;
a power supply disposed in electrical communication with the supply wire, wherein the power supply supplies the first electrical current to the supply wire; and
an electric vehicle including a charging receiver unit, the charging receiver unit having:
a plurality of core members disposed in spaced relationship to one another, wherein each of the plurality of core members is aligned longitudinally with said at least one magnetic element;
a plurality of biasing devices, wherein each of the plurality of biasing devices longitudinally biases a respective one of the plurality of core members toward said at least one magnetic element such that magnetic flux is transmitted between said at least one magnetic element and the plurality of core members;
a receiver wire disposed in electrical communication with each of the plurality of core members, wherein magnetic flux in the plurality of core members induces electrical current in the receiver wire; and an energy storage device disposed in electrical communication with the receiver wire, wherein the receiver wire transmits the second electrical current to the energy storage device.

10. An induction charging system, as set forth in claim 9, wherein the charging supply unit further includes a plate presenting a first surface; and
wherein said at least one magnetic element is embedded within the plate.

11. An induction charging system, as set forth in claim 9, the charging receiver unit further having a housing defining a plurality of bores, wherein each of the plurality of bores extends to a respective ceiling;
wherein each of the plurality of core members is movably disposed in a respective one of the plurality of bores; and
wherein each of the plurality of biasing devices is disposed between the respective one of the plurality of core members and the corresponding ceiling such that each of the plurality of biasing devices reacts between the respective one of the plurality of bores and the respective ceiling to bias each of the respective one of the plurality of core members longitudinally away from the respective ceiling and toward said at least one magnetic element such that magnetic flux is transmitted between said at least one magnetic element and the plurality of core members.

12. An induction charging system, as set forth in claim 9, wherein the charging receiver unit is movable longitudinally away from the vehicle and toward said at least one magnetic element.

13. An induction charging system, as set forth in claim 12, further comprising an actuator operatively connected to the charging receiver unit and configured for moving the charging receiver unit longitudinally between an extended position and a retracted position;
wherein the extended position is away from the vehicle, in a direction toward said at least one magnetic element, and the retracted position, in a direction opposite said at least one magnetic element.

14. An induction charging system, as set forth in claim 9, wherein said at least one magnetic element is a plurality of magnetic elements disposed in spaced relationship to one another.

15. An induction charging system, as set forth in claim 14, wherein the plurality of core members are arranged in a first array and the plurality of magnetic elements are arranged in a second array.

16. An induction charging system, as set forth in claim 15, wherein the receiver wire extends between a first set of core members and a second set of core members such that magnetic flux flows between the plurality of core members and the plurality of magnetic elements to induce the first electrical current through the receiver wire; and
wherein the magnetic flux flowing through the first set of core members is of opposite polarity to the magnetic flux flowing through the second set of core members.

17. An induction charging system, as set forth in claim 16, wherein the supply wire extends between a first set of magnetic elements and a second set of magnetic elements to generate magnetic flux through the plurality of magnetic elements; and
wherein the magnetic flux generated through each of the first set of magnetic elements is of opposite polarity to the magnetic flux generated through each of the second set of magnetic elements such that the second electrical current flowing through the supply wire generates magnetic flux through the plurality of magnetic elements.

18. An induction charging system, as set forth in claim 15, wherein the plurality of the core members are arranged in a first grid-like array having a plurality of columns;
wherein the receiver wire is woven back and forth between each adjacent pair of the plurality of columns of the core members such that the magnetic flux flows between the plurality of core members and the plurality of magnetic elements to induce the first electrical current through the receiver wire; and
wherein the magnetic flux flowing through the core members in each of the plurality of columns is of opposite polarity to the magnetic flux flowing through the core members in the respective adjacent column.

19. An induction charging system, as set forth in claim 18, wherein the plurality of magnetic elements are arranged in a second grid-like array having a plurality of columns;
wherein the supply wire is woven back and forth between each adjacent pair of the plurality of columns of magnetic elements to generate magnetic flux through the plurality of magnetic elements; and
wherein the magnetic flux generated through each of the magnetic elements in each of the plurality of columns is of opposite polarity to the magnetic flux generated through each of the magnetic elements in the respective adjacent column such that the second electrical current flowing through the supply wire generates magnetic flux through the plurality of magnetic elements.

20. An induction charging system comprising:
a charging supply unit including:
a plurality of magnetic elements disposed in spaced relationship to one another;
a supply wire in electrical communication with each of the plurality of magnetic elements, wherein a first electrical current is transmitted through the supply wire and induces magnetic flux in each of the plurality of magnetic elements; and
an electric vehicle including a charging receiver unit, the charging receiver unit having:
a plurality of core members disposed in spaced relationship to one another, wherein each of the plurality of core members is aligned longitudinally with a respective one of the plurality of magnetic elements;
a plurality of biasing devices, wherein each of the plurality of biasing devices longitudinally biases a respective one of the plurality of core members toward a respective one of the plurality of magnetic elements such that magnetic flux is transmitted between each of the plurality of magnetic elements and the respective one of the plurality of core members;
a receiver wire disposed in electrical communication with each of the plurality of core members, wherein magnetic flux in the plurality of core members induces electrical current in the receiver wire.

* * * * *